United States Patent [19]

Bisplinghoff et al.

[11] Patent Number: 5,076,984
[45] Date of Patent: Dec. 31, 1991

[54] METHOD FOR FABRICATING THERMAL INSULATION

[75] Inventors: Ross L. Bisplinghoff, Norfolk; Robert J. Castoldi, Newton; Peter F. Pescatore, Saugus; Thomas P. Schregardus, Somerville, all of Mass.

[73] Assignee: Raytheon Company, Lexington, Mass.

[21] Appl. No.: 596,650

[22] Filed: Oct. 10, 1990

[51] Int. Cl.⁵ .............................................. B32B 17/02
[52] U.S. Cl. ................................... 264/102; 264/112; 428/69; 428/76
[58] Field of Search ............... 264/510, 101, 102, 112; 428/69, 76

[56] References Cited

U.S. PATENT DOCUMENTS

| | | | |
|---|---|---|---|
| 3,962,014 | 6/1976 | Hughes et al. | 264/112 |
| 4,159,359 | 6/1979 | Pelloux-Gervais | 428/76 |
| 4,184,601 | 1/1980 | Stewart | 65/34 X |
| 4,238,430 | 12/1980 | Phillips | 264/15 |
| 4,272,259 | 6/1981 | Patterson et al. | 55/74 |
| 4,492,725 | 1/1985 | Ishihara et al. | 428/69 |
| 4,529,638 | 7/1985 | Yamamoto | 428/69 |
| 4,594,279 | 6/1986 | Yoneno | 428/69 |
| 4,636,415 | 1/1987 | Barito et al. | 428/68 |
| 4,681,788 | 7/1987 | Barito et al. | 428/68 |
| 4,745,015 | 5/1988 | Cheng | 428/76 X |
| 4,798,753 | 1/1989 | Abuaf et al. | 428/69 |

Primary Examiner—Mary Lynn Theisen
Attorney, Agent, or Firm—William R. Clark; Richard M. Sharkansky

[57] ABSTRACT

A method for fabricating evacuated panels for use in cooling apparatus, such panels being particularly well suited for use in refrigerators. The method includes a preconditioning step in which the powder filler of the panel is heated and agitated, prior to placement in an air permeable pouch for compression and then in a barrier container for evacuation.

11 Claims, 1 Drawing Sheet

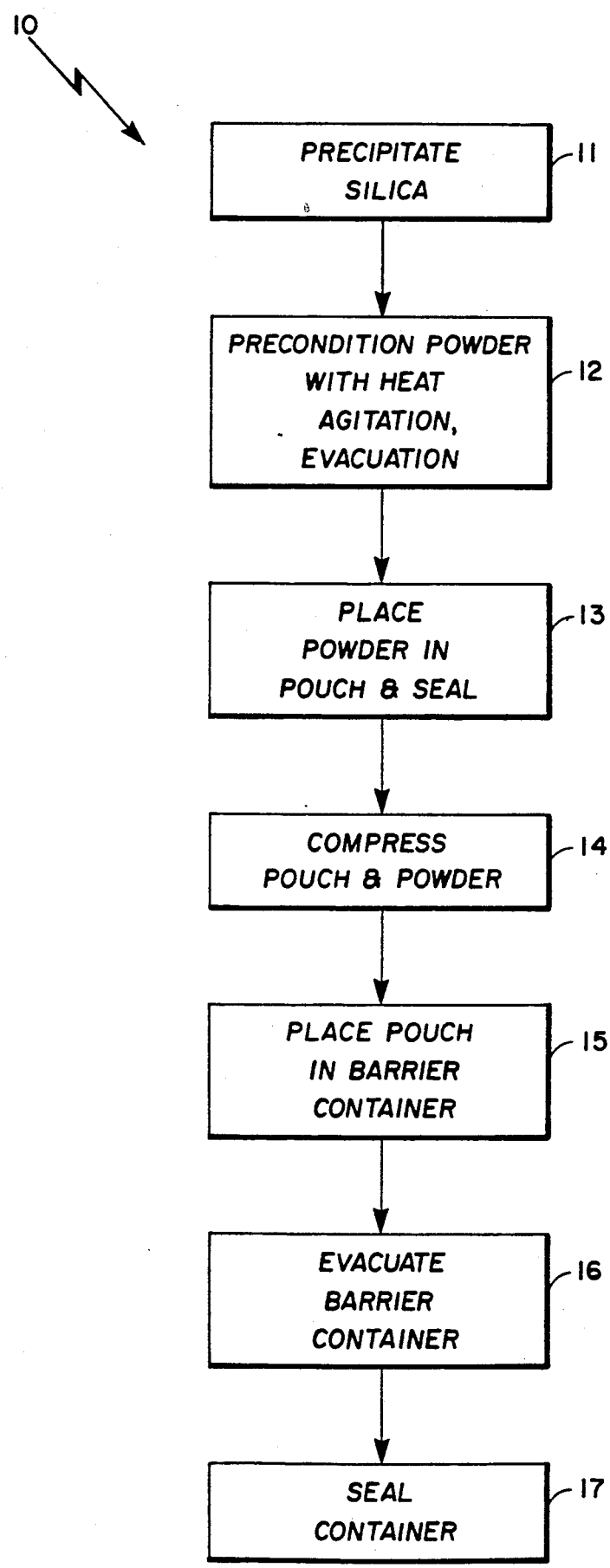

METHOD FOR FABRICATING THERMAL INSULATION

BACKGROUND OF THE INVENTION

This invention relates generally to thermal insulation and more particularly to a method for providing a thermal insulation structure suitable for refrigeration applications.

As it is known in the art, a method currently used for providing thermal insulation in refrigeration appliances is to use foam insulation, such as polyurethane foam. Foam insulation contains chlorofluorocarbons (CFCs) which have been discovered to be environmentally damaging. The Environmental Protection Agency is mandating a reduction in future use of CFCs. Further, strict new standards are being promulgated regarding energy consumption by the Department of Energy. As a result of these emerging requirements, manufacturers of refrigeration products are extending substantial efforts in order to provide alternative insulation structures which would reduce the use of CFCs and improve the energy efficiency of refrigeration appliances.

One technology known in the art that appears promising toward meeting these goals, is the use of evacuated panel insulation in which a powdered material having a relatively large capacity to adsorb gases is compressed and enclosed within a container made of a material having relatively low permeability to gases. The container is evacuated to provide a panel having suitable thermal insulation properties for use in refrigeration applications. The panels thus provided are relatively rigid and may be easily arranged in refrigeration products, such as in the door and walls of a refrigerator.

As it is further known in the art, evacuated panel insulation, like other thermal insulation structures, should contribute to providing refrigeration appliances with several desirable characteristics such as relatively low energy consumption, a long expected life, and manufacturing economic feasibility. Energy consumption of refrigeration appliances is based on, inter alia, the thermal conductivity of the insulating material which is related to conductive heat transfer. In the case of an evacuated panel, long-term thermal performance is based on the ability of the insulation to adsorb gases or getter. Such gettering reduces interstitial gas pressure, thereby reducing heat transfer by convection. The expected life of the refrigeration appliance is dependent on the expected insulation life and, generally, refers to the time duration over which the appliance operates without significant degradation in energy consumption. Manufacturing economic feasibility encompasses several factors such as material cost, equipment cost, ease of manufacture, and production time.

SUMMARY OF THE INVENTION

It is an object of this invention to provide a thermal insulation structure suitable for use in refrigeration appliances which would reduce the use of chlorofluorocarbons.

It is also an object of this invention to provide a thermal insulation structure having energy efficiency suitable for refrigeration appliances.

A further object of this invention is to provide evacuated panel thermal insulation that is relatively inexpensive, easy, and fast to manufacture.

In accordance with the present invention, a method for providing a thermal insulation structure comprises the steps heating a silica powder to a temperature between approximately 175° C. and 300° C., applying a compressive force on the powder, placing the powder into a container having relatively low permeability to gases, evacuating the container to provide a predetermined pressure level within the container, and sealing the container to provide a rigid block or board-like thermal insulation structure. The method for providing a thermal insulation structure may further include any of the steps of: providing the silica powder by precipitating silica by the reaction of an alkaline water glass and a mineral acid, containing the powder in an air permeable pouch, agitating the powder concurrently with the heating step, and evacuating the powder concurrently with heating step. The air permeable pouch may be used to contain the silica powder in order to facilitate further processing. Heating the powder results in the removal of contaminants from the surface of the powder particles. Evacuating and/or agitating the powder while it is heated reduces the time required for the removal of contaminants. The removal of powder contaminants improves, inter alia, the expected panel life and the gettering capacity of the resulting thermal insulation structure. The improvement in gettering capacity reduces the energy consumption of the refrigerator by reducing heat leakage. Further, the removal of powder contaminants reduces the time required to evacuate the container having relatively low permeability to gases, thereby reducing the time and cost associated with the manufacture of the insulation.

Since the powder is heated prior to its placement in the air permeable pouch, the heating temperature is not restricted or limited by the material characteristics of the pouch. Thus, the powder can be heated to a higher temperature (e.g. 175° C.-300° C.) than was used heretofore, and the processing time has therefore been reduced. Also, by agitating and/or evacuating the powder during the heating step, powder contaminants are driven off faster and more effectively, thus improving the gettering capacity of the powder.

With the method of the present invention, a rigid block, or board-like evacuated panel, particularly well suited for use in refrigeration appliances, is provided having improved thermal performance, reduced manufacture time, and reduced cost. The reduction in manufacture time and cost is achieved by the reduction in the amount of time required to evacuate the container having relatively low permeability to gases. The reduction in evacuation time achieved by the elimination of powder contaminants during the heating step, which would otherwise be removed during the evacuation. The increase in gettering capacity provided by powder contaminant removal in the heating step provides a reduction in heat leakage which increases the panel life and also a reduction in the energy consumption of the appliance.

BRIEF DESCRIPTION OF THE DRAWING

The foregoing features of this invention, as well as the invention itself, may be more fully understood from the following detailed description of the drawing in which:

The FIG. is a flow diagram of a method for providing an evacuated thermal insulation panel in accordance with the present invention.

DESCRIPTION OF THE PREFERRED EMBODIMENT

Evacuated panel thermal insulation generally includes three components: a powder substance, an air permeable pouch, and a barrier container. Generally, evacuated panels are provided by containing the powder in the air permeable pouch, compressing the powder filled pouch, placing the compressed pouch into a barrier container having relatively low permeability to gases, and evacuating the barrier container to a desired pressure level. Preferably, the resulting evacuated panel has a thickness of approximately 0.25 to 1.5 inches, a thermal conductivity of less than or equal to approximately 0.06 Btu·inches/ft$^2$·hr·° F., and an operating lifetime of approximately twenty years. The resulting evacuated panel provides substantially equivalent thermal performance characteristics to conventionally used polyurethane foam insulation with approximately one-third of the insulation thickness, or alternatively provides significantly improved thermal performance characteristics with the same insulation thickness.

In determining a suitable powder for use in evacuated panel thermal insulation, several factors should be considered. The powder should have relatively small particle size in order to provide relatively small voids between the adjacent powder particles in order to reduce the heat leakage into the refrigeration appliance by the process of convection. The preferred particle size is between approximately 70–1000 Å. Further, the preferred powder has a relatively high void volume, or equivalently, low density, in order to provide a high thermal resistance path for potential heat transfer by the process of conduction. The preferred powder bulk density is between approximately 3–10 lbs./foot$^3$. A relatively large powder particle surface area is further desirable since it improves the ability of the powder to adsorb gas molecules by providing a large surface area onto which gases may adhere. The preferred powder surface area is between approximately 200 and 400 meters$^2$/gram. The ability of the powder to adsorb gases is referred to as gettering. The gettering capacity of the powder is particularly important since it affects both the energy consumption and the expected operating lifetime of the resulting refrigeration appliance. The preferred powder is relatively inexpensive in order to be competitive with conventionally used foam insulation. The preferred powder, here, is a precipitated silica, formed by the interaction of an alkaline water glass and a mineral acid, for example sodium water glass and sulfuric acid. Examples of suitable silica powders are Zeothix 177 and Zeothix 265 which are available from J. M. Huber Corporation of Havre De Grace, Maryland and Sipernat 22LS available from North American Silica Corporation of Valley Forge, Pennsylvania. Although precipitated silicas are desirable, particularly due to their relatively low cost, fumed silica powders are also suitable for use in the present invention.

An air permeable, porous pouch may be used to provide a container for the powder to facilitate processing. Due to the air permeable characteristics of such a pouch, it is often referred to as a "tea bag". The air permeable pouch material is chosen based on its ability to contain the powder which is a function of both the porosity of the pouch material and the powder particle size. The pouch is further chosen due to its air permeability characteristics. The air permeability of the pouch is an important factor since, as previously mentioned, during processing, the pouch is placed in a barrier container which is subsequently evacuated, and thus the permeability of the pouch impacts the time required to evacuate the barrier container to the desired pressure level. Other, less critical factors in the determination of a suitable pouch material are the ease with which the pouch may be sealed, for example by heat sealing or adhesive bonding, and the durability of the pouch, so that handling during fabrication will not damage the pouch.

The barrier container, into which the powder, or powder filled pouch, is disposed during processing, should be relatively impermeable to gases in order to optimize the efficiency of the resulting insulation structure. The permeation rate of the barrier container directly affects both the occurrence of heat leakage, and thus the energy consumption of the refrigeration appliance, as well as the operating lifetime of the appliance. Although the powder will adsorb a certain amount of gases which leak through the barrier container the powder has a limited gettering capacity.

Since metal materials are relatively impermeable to gases, it is desirable to have the barrier container made of a metal. However, while a metal barrier container would minimize heat leakage by minimizing the permeation of gases, the thicker the metal, the higher the thermal conductivity of the container. In general, the highest thermal conductivity of a metal barrier container occurs along its outer edges, along which the container is sealed. In sealing the barrier container, the metal along the outer edges of the container contacts only the metal of the opposite side of the container, thus providing a relatively low thermal resistance path indicative of a metal. However, it should also be noted that the larger the size of the evacuated panel and thus the barrier container, the less the effect of the thermal loss associated with the outer edges of the container on the overall thermal conductivity of the panel. For the reasons described above, suitable barrier containers may, for example, contain a layer of aluminum foil, may comprise a metalized film laminate, or may be comprised of a multi-layer plastic film.

Referring now to FIG. 1, a method 10 for providing evacuated panels having thermal insulation properties suitable for refrigeration applications is provided. In step 11, silica is precipitated in order to provide a fine powder which becomes the filler material for the evacuated panel. Precipitated silicas are formed by the interaction of an alkaline water glass and a mineral acid. For example, precipitated silica may be provided by the interaction of a sodium water glass and sulfuric acid. The preferred powder has relatively small particle size, high void volume, and large particle surface area for reasons previously described. Various precipitated silicas having a variety of properties, such as having a higher capacity to getter one gas over another, are commercially available.

As mentioned above, it is desirable that the powder have relatively large gettering capacity in order to improve the thermal performance and extend the expected life of the refrigeration appliance. It is further desirable, to reduce the manufacturing time and cost associated with providing the evacuated panels. Step 12, in which the powder is preconditioned, provides such desirable results. In step 12, the powder is heated to a temperature sufficient to remove contaminants from the surface of the powder particles. Here, the powder is heated to a temperature between approximately 175° C. and 300° C.

Since the powder is heated prior to being placed in an air permeable pouch in step 13, the heating temperature is not restricted or limited by material characteristics of the pouch. Thus, the powder can be heated to a higher temperature than was heretofore used. This higher heating temperature reduces the processing time by reducing the time required to remove powder contaminants and thus the time required to evacuate the panel (step 16). It should be noted that the powder may be heated to even higher temperatures, however, the slight increase in contaminant removal thus achieved, generally does not warrant the additional cost of equipment capable of heating the powder to such high temperatures. Further, at temperatures above approximately 500° C.–550° C., the powder will experience non-reversible, damaging changes in composition. The gettering capacity of the powder is improved with such preconditioning, since, in driving off surface contaminants, the powder particles are more readily able to accept gases in the gettering process. In preconditioning step 12, the powder may be agitated concurrently while it is heated in order to speed up the contaminant removal process by exposing maximum powder particle surface area onto which the contaminants have adhered. Preconditioning step 12 may further include evacuating the powder concurrently with heating or with heating and agitating the powder. The evacuation of the powder further speeds up the removal of contaminants from the surface of the powder particles, thereby further enhancing the gettering capacity of the powder. The preconditioning provided in step 12 further provides a reduction in the time required to evacuate the panel as will be described in conjunction with step 16. It should be noted that, evacuating the powder during preconditioning step 12, increases both the initial equipment cost as well as the cost of operating the equipment. In certain applications, the benefit in gettering capacity achieved by evacuating the powder as it is heated, and possibly also agitated, does not warrant the additional cost.

One type of apparatus for preconditioning the powder (step 12) with heat and agitation is to use a fluidized bed drier in which heated air is directed through the powder. The flow of heated air both heats and agitates the powder to drive off powder contaminants. Alternative apparatus for preconditioning the powder by heating consists of placing the powder in a heated chamber in which an agitating mechanism, or a stirrer, may be disposed to provide agitation. In applications where it is desired to further improve the gettering capacity of the powder, a vacuum pump may be attached to such a chamber to evacuate the powder as it is concurrently heated and possibly agitated.

Here, once the powder is preconditioned, it is placed into an air permeable pouch and the pouch is sealed by any conventional technique (step 13), for example by heat sealing or adhesive bonding. The purpose of the air permeable pouch is to contain the powder to facilitate further processing, while preferably not inhibiting the time required to evacuate the barrier container, as will be described in conjunction with step 16. In certain applications it may be desirable to eliminate the use of the air permeable pouch.

The powder, and here the powder filled pouch, is then compressed in step 14 to provide a relatively fragile uniformly thick form having voids of uniform size between the powder particles. The uniform thickness of the form contributes to providing an evacuated panel with uniform thickness, such uniform panel thickness being desirable in order to facilitate the placement of the panels in refrigeration appliances. Uniformity in the size of the voids between powder particles contributes to providing an evacuated panel with uniform thermal conductivity. Preferably the powder is compressed immediately after preconditioning step 12, so that the powder does not become re-contaminated after preconditioning step 12. Although the outer surface of the air permeable pouch will become slightly contaminated during the compression step 14, this contamination is quickly removed during evacuation step 16 as will be described. Here, a conventional hydraulic press is used to compress the powder filled pouch with a pressure between approximately 10–20 lbs./inch$^2$. The preferred compressive force is chosen to provide voids between the powder particles which are sufficiently small to inhibit heat transfer by convection, but are large enough to inhibit conductive heat transfer.

Once the fragile, uniformly thick form is provided in step 14, it is placed into a barrier container having relatively low permeability to gases. In step 16, the barrier container is evacuated. As previously mentioned, it is desired to minimize the time required to evacuate the barrier container to a desired pressure level, in order to reduce manufacturing time of the panels and thus reduce the overall cost of providing the panels. The pressure level to which the barrier container is evacuated is related to the thermal conductivity of the resulting panel such that, generally, the lower the pressure level, the lower the thermal conductivity. Preferably, the barrier container is evacuated to a pressure level of between approximately 0.1 and 80 torr.

Finally, once the barrier container has been evacuated to the desired pressure level (step 16), the container is sealed (step 17) by any conventional technique, for example heat sealing or adhesive bonding, to provide a rigid board-like or block evacuated panel structure.

The rigid evacuated panels thus provided demonstrate thermal performance suitable for refrigeration appliance use, such thermal performance equivalent to that of significantly thicker, foam insulation. Thus, equivalent thermal performance may be provided by thinner evacuated panel insulation, thereby reducing the overall size of the refrigeration appliance or maintaining constant such size and providing increased volume inside the food compartment. Alternatively, the thickness of the insulation may be kept the same as with foam insulation and an improved thermal performance provided. However, it may be desirable to use evacuated panels in conjunction with foam insulation since the foam insulation provides important mechanical strength to the refrigeration appliance which is not achieved with the use of evacuated panels alone.

With the method 10 described above, an evacuated panel thermal insulation structure is provided which reduces the use of chlorofluorocarbons and provides suitable energy efficiency characteristics for refrigeration applications. More particularly, the heating in preconditioning step 12 increases the gettering capacity of the powder which improves the expected life, reduces the energy consumption, and reduces manufacture time and cost associated with the use of evacuated panel insulation in refrigeration appliances. The following is an example of the practice of the present invention.

EXAMPLE

Several containers, each with 53 grams of a precipitated silica, were preconditioned by various techniques, including heat only at a variety of temperatures and heat with concurrent evacuation at various temperatures. The preconditioning specifics are listed in the first column of the table below. In each case, the powder was preconditioned for two hours. The precipitated silica used here is sold by J. M. Huber Corporation of Havre De Grace, Maryland under the product name Zeothix 265 and is preferential to gettering water vapor over other gases. Here, a heated chamber having a vacuum pump attached thereto was used to precondition the powders. Following the preconditioning step, each container of powder was weighed and such weight compared to the original weight to provide a weight loss percentage as indicated in the second column of the table below. The higher the percent weight loss, the more contaminants removed from the powder and thus, the larger the gettering capacity of the powder.

The quantities of preconditioned powder were then placed into air permeable pouches, here of thermal bonded, non-woven polypropylene fabric, 0.008 inches thick, and available from Fibreweb Corporation, Simpsonville, South Carolina. The powder filled pouches were then compressed using conventional hydraulic pressing apparatus to a compression level of approximately 15 lbs./inch. After the powder filled pouches were compressed to uniformly thick forms, such forms were placed into barrier containers having three sealed sides and a fourth side open to facilitate evacuation. Here, the barrier containers used have multi-layer laminate composition comprised of layers of nylon, aluminum foil, and low density polyethylene and are available from Ludlow Corporation of Homer, Louisiana under the product name Marvelseal 360. The barrier containers were then placed, one at a time, in a chamber adapted with apparatus to seal the containers and a vacuum pump. The chamber, and thus the barrier containers, were evacuated to a pressure of approximately 300 millitorr and then a heated metal bar was disposed over the fourth, open side of the barrier containers to seal the containers by heat sealing.

The following Table lists the percentage weight loss, the time required to evacuate the barrier container to a pressure level of 300 millitorr, and the average K factor of the resulting evacuated panels fabricated in accordance with the present invention with various preconditioning steps.

TABLE

| Preconditioning | Weight Loss (percent) | Time Required to Evacuate to 300 mt (minutes) | K-factor Btu · inches hr · ft² · °F. |
|---|---|---|---|
| heated to 105° C. | 2.98 | 12.07 | .0405 |
| heated to 125° C. | 4.19 | 9.80 | .0395 |
| heated to 150° C. | 5.70 | 5.12 | .0393 |
| heated to 175° C. | 7.40 | 2.88 | .0387 |
| heated to 105° C. & evacuated to 300 mt | 6.80 | 2.67 | .0395 |
| heated to 200° C. | 8.45 | 2.67 | .0383 |
| heated to 200° C. & evacuated to 300 mt | 9.28 | 2.73 | .0370 |

Having described preferred embodiments of the invention, it will now become apparent to one of skill in the art that other embodiments incorporating their concepts may be used. It is felt, therefore, that these embodiments should not be limited to disclosed embodiments, but rather should be limited only by the spirit and scope of the appended claims.

What is claimed is:

1. A method for providing a thermal insulation structure comprising the steps of:
   heating a silica powder to a temperature between approximately 175° C. and 300° C.;
   applying a compressive force on said powder;
   placing said powder into a container having relatively low permeability to gases;
   evacuating said container to produce a predetermined pressure level within the said container; and
   sealing said container to provide a rigid thermal insulation structure.

2. The method as recited in claim 1 wherein the heated powder is contained in an air permeable pouch.

3. The method as recited in claim 1 wherein the powder is agitated concurrently with the heating step.

4. The method recited in claim 1 further comprising the step of precipitating silica by the reaction of an alkaline water glass and a mineral acid to provide said silica powder.

5. The method as recited in claim 1 wherein the powder is evacuated concurrently with the heating step.

6. The method recited in claim 1 wherein said container is evacuated to a pressure between approximately 0.1 and 80 torr.

7. The method recited in claim 1 wherein the compressive force is between approximately 10 and 20 lbs./inch².

8. A method for providing an evacuated panel for comprising the steps of:
   heating silica powder to a temperature between approximately 175° C. and 300° C.;
   pressing said heated powder with a force between approximately 10 and 20 lbs./inch²;
   placing said pressed powder into a container having relatively low permeability to gases; and
   reducing the pressure within said container to a predetermined pressure level.

9. The method recited in claim 8 wherein said heated silica is contained in an air permeable pouch prior to said pressing step.

10. The method recited in claim 8 wherein the predetermined pressure is between approximately 0.1 and 80 torr.

11. The method recited in claim 8 wherein said powder is evacuated or agitated concurrently with said heating step.

* * * * *